United States Patent

[11] 3,604,952

[72] Inventor William M. Regitz
Franklin, Mass.
[21] Appl. No. 10,829
[22] Filed Feb. 12, 1970
[45] Patented Sept. 14, 1971
[73] Assignee Honeywell Inc.
Minneapolis, Minn.

[54] TRI-LEVEL VOLTAGE GENERATOR CIRCUIT

19 Claims, 2 Drawing Figs.

[52] U.S. Cl. .......... 307/264, 307/208, 307/209, 307/251, 307/265, 307/279, 307/304, 328/63
[51] Int. Cl. .......... H03k 5/01
[50] Field of Search .......... 307/205, 208, 209, 251, 260, 264, 265, 269, 279, 304; 328/63

[56] References Cited

UNITED STATES PATENTS

| | | | |
|---|---|---|---|
| 3,156,830 | 11/1964 | Walsh .......... | 307/209 |
| 3,407,339 | 10/1968 | Booher .......... | 307/251 X |
| 3,446,989 | 5/1969 | Allen et al. .......... | 307/208 |

*Primary Examiner*—Stanley T. Krawczewicz
*Attorneys*—Fred Jacob and Leo Stanger

ABSTRACT: Herein is revealed an adaptive tri-level voltage generator circuit which may be used with a random access memory cell and which circuit employs transistors preferably of the silicon gate or MOS (metal oxide semiconductor) field effect type. The illustrated embodiment employs a feedback subcircuit arrangement wherein a feedback controllable voltage is established in the feedback loop. Timing signals are received in a fixed relationship so that initially a first voltage level is established on the circuit's output line. An intermediate voltage level is established on the output line upon receipt of a first timing signal activating the feedback subcircuit to lower the feedback voltage. Such intermediate voltage is determined by the voltage drops in a feedback subcircuit. By means of a control subcircuit, receipt of a second timing signal causes the output to settle at a third level approaching the level of the first timing signal which is still present. Removal of the first timing signal causes the output to return to its initial level. The intermediate voltage adapts to changes in the threshold voltage of transistors included in the feedback subcircuit.

PATENTED SEP 1 4 1971 3,604,952

INVENTOR
WILLIAM M. REGITZ
BY John S. Solakian
ATTORNEY

TRI-LEVEL VOLTAGE GENERATOR CIRCUIT

BACKGROUND OF THE INVENTION

1. Field of the invention

The present invention relates generally to voltage generator circuits and more particularly to an adaptive tri-level voltage generator circuit employing transistors preferably of the field effect type.

2. Description of the Prior Art

The tri-level voltage generator of the present invention may be used with a transistor memory cell as described in the pending application entitled "Electronic Memory Storage Element," inventor William M. Regitz, SER. NO. 808,421, filed Mar. 19, 1969, and assigned to the assignee of the present invention. The storage cell of such copending application and as described therein operates with a selection control voltage having one of three values. Means for generating this selection control voltage or tri-level voltage is the subject matter of this invention. As described therein, during a bit line charge interval a selection voltage has a value, illustratively ground, that maintains the three transistors in the fundamental cell nonconducting. During write and refresh operations the selection voltage has a relatively large negative value, however, during read operations the selection voltage has a value intermediate the other values. The intermediate voltage generated by the voltage generator of the invention adapts to the change in threshold voltage characteristics of the transistor in the memory cell when said circuit and cell are in the same environment such as in the same integrated circuit chip. Detailed reasons for the requirement of these three voltage levels may be ascertained by reference to the above referenced application.

The prior art includes a multitude of voltage generator circuits. One method of generating a tri-level voltage in response to reference or timing signals having binary states is to connect a gate network so that receipt of a first timing signal through a first gate network would allow a selected first level of a supply voltage to appear at the output, and wherein receipt of a second timing signal may be suitably coupled by a second gate network to the output so that an intermediate voltage level derived from the supply voltage will be established on the output. Similarly, receipt of a third timing signal would then establish by utilization of a third gate network, a third voltage level on the output. Finally, receipt of the first timing signal and/or removal of the other timing signals would reestablish initial conditions. One of the problems associated with this prior art arrangement is that the intermediate voltage must be set from without the prior art generator circuit and is not adaptive to a change in characteristics of a utilizing circuit. In the large volume production of such generator and utilizing circuits such as the above-mentioned transistor memory cell, this problem is amplified since at least the intermediate voltage must be set for each transistor memory cell to compensate for its characteristics and changes in such characteristics.

It is therefore desirable to implement such a tri-level voltage generator having stable output voltages.

It is an object of the present invention to provide a tri-level voltage generator circuit which produces an adaptive output voltage from unit to unit despite variations in the characteristics making up each unit.

It is also an object of this invention to provide a tri-level voltage generator circuit which generates an intermediate voltage partly dependent on its process parameters and which is easily and economically fabricated and which operates at a low power level, particularly one using field effect transistors.

These and other objects will become apparent from the following summary and detailed description of the invention.

SUMMARY OF THE INVENTION

Briefly, the tri-level voltage generator circuit of the present invention employs first, second and third reference or timing signals which are provided in binary states at appropriate times. A feedback controllable first potential is established by means of a combination of transistors whose output is connected to a feedback point. This potential which is controlled by the output of a feedback subcircuit is applied to the gate input of a first transistor whose source is connected to the tri-level circuit's output and whose drain is connected to receive the first timing signal. With the feedback subcircuit disabled by a third reference signal, the feedback potential and first reference signal cause an output approaching the 0-voltage level of the first reference signal to appear on the output. A third timing signal then reenables the feedback subcircuit. A change in state of the first reference signal to a negative voltage causes the first transistor to conduct thereby causing the feedback subcircuit to lower the feedback potential at the feedback point which in turn turns off the first transistor. An intermediate voltage level is thus established on the output line in a direction toward the negative voltage state of the first reference signal and at a level determined by the voltage drop through the transistors in the feedback subcircuit. Upon receipt of a second timing signal, a second transistor connected in parallel with the first transistor is caused to conduct thereby causing the output voltage level to approximate the negative voltage state of the first timing signal. During this time, the feedback subcircuit remains enabled. Finally, the change in state of the first timing signal back to its zero voltage level causes the second transistor to conduct in the reverse direction thereby changing the voltage on the output back to approximately the 0-voltage level of the first reference signal. At this time, the feedback potential returns to its initial condition thereby allowing regeneration of another sequence.

The advantages of the foregoing configuration of the present invention will become more apparent upon reading the accompanying detailed description in connection with the drawings.

DESCRIPTION OF THE PREFERRED EMBODIMENT

Figure 1:
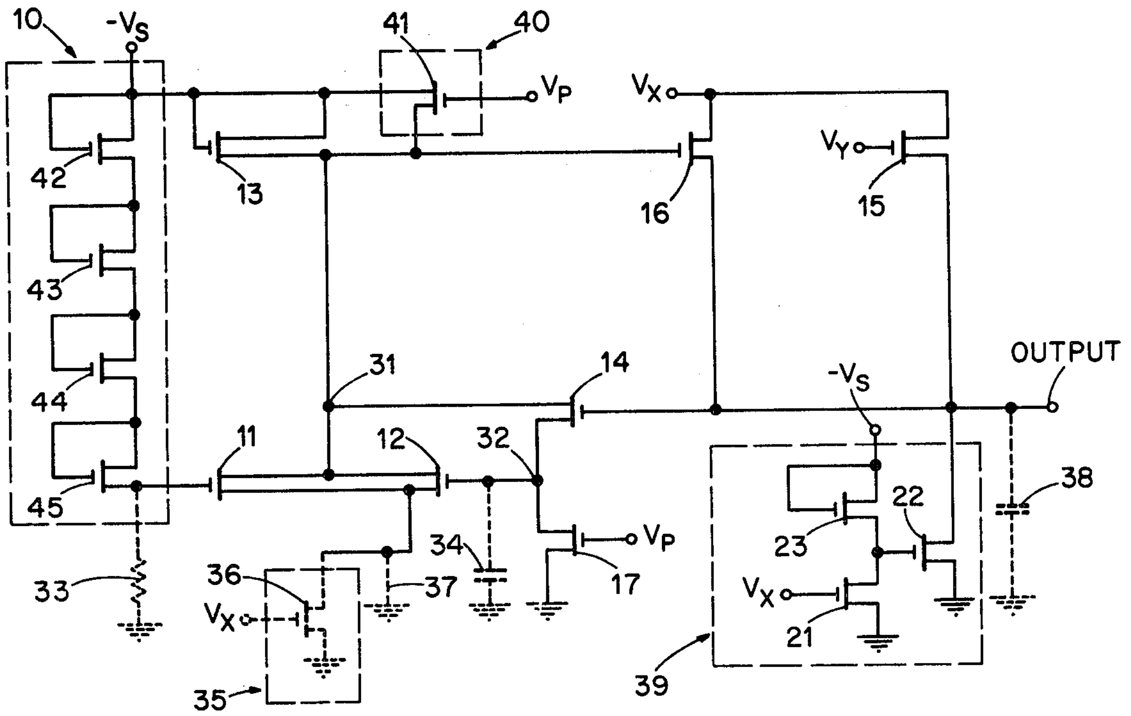
FIG. 1 is a schematic diagram of a preferred embodiment of the tri-level voltage generator circuit of the invention.

Although it is not contemplated that the present invention be limited to particular types of transistors, illustratively, the circuit of FIG. 1 employs *p*-channel silicon gate or MOS (metal oxide semiconductor) field effect transistors A full understanding of such transistors may be ascertained by reference to the book entitled "MOSFET in Circuit Design," by Robert H. Crawford, Texas Instruments Electronic Series, McGraw-Hill Book Company, 1967 and to the article entitled "Silicon-Gate Technology " appearing at pages 28 through 35 of the publication entitled, IEEE Spectrum, volume 6, Number 10, Oct. 1969.

Briefly, however, the characteristics of such devices are that the impedance between a drain and a source electrode is regulated by the voltage, referred to as a threshold voltage, at the gate electrode. The voltage impressed on the gate electrode determine the value of the current flowing in the transistor. For example, if the source is grounded and the drain is at a negative potential, the current commences to flow between the drain and the source electrode when the gate voltage exceeds the threshold voltage ordinarily designated by the symbol $V_T$. A typical value of $V_T$ is approximately −2 volts. Current will not flow if the gate electrode is connected to the substrate potential. When we say that the transistor is capable of conducting, this means that the gate electrode is more negative than the other electrodes. Also contemplated as falling within the scope of the present invention are *n* channel type MOS or silicon gate field effect transistors including the enhancement type and the depletion type.

In FIG. 1 a preferred embodiment of the tri-level voltage generator circuit of the present invention is illustrated. In this FIGURE, there is always a leakage path, i.e., a resistive or capacitive leakage path from all of the components to the substrate which is at ground or 0 potential. Only those capacitances and resistances which are expedient for the explanation of the circuit are shown and as such are shown with dotted lines. Capacitances of this type which are effectively parasitic include capacitor 38 which is coupled between the output and ground, capacitor 34 which is coupled in the feedback subcircuit between point 32 and ground, and a resistive leakage path 33 which is coupled between ground and one side of voltage reference 10. The basic circuit of the invention does not include those elements within dotted lines 35, 39 and 40. The basic circuit does include, however, the dotted line connection 37 to ground.

The voltage reference 10 includes four transistors 42, 43, 44 and 45. These transistors form a voltage drop based on their characteristics. We can assume that these characteristics are representative of the remainder of the transistors in the circuit since they with the remainder of circuit will be on the same integrated circuit chip. By using four transistors in series, we amplify the change in characteristics, that is the threshold voltage. It should be noted that these transistors have specific voltage drops to produce approximately −7 volts at the gate of transistor 11 as follows. With supply voltage $-V_S$, which is for example −20 volts coupled to the drain and gate electrodes of transistor 42 transistor 42 is turned on and thereby applies substantially −20 volts but due to the voltage drop across transistor 42 essentially −16 volts to the source of transistor 42. This −16 volts is coupled to the drain and gate of transistor 43 thereby turning it on and establishing of somewhat lower potential of approximately −13 volts on the source of transistor 43. This condition is amplified until the source electrode of transistor 45 which is coupled to the gate of transistor 11 has a voltage of approximately −7 volts impressed thereon. A combination of the voltage reference 10 and the leakage resistance 33 establishes a fixed divider network and a bias therefor on the gate of transistor 11. As will be discussed, the purpose of voltage reference 10 is to establish the proper voltage level at point 31. This potential at point 31 establishes the time relationship of the loop and effects the output at the intermediate level. As will also be discussed, the intermediate level at the output may be changed by changing the number of transistors in reference source 10, by changing the impedance ratios established by transistors 11 and 13, or by changing the number of transistors in the feedback subcircuit comprising transistors 12 and 14.

Transistor 13 has its gate and drain connected to supply $-V_s$. Therefore it will be on during the operation of the circuit. The source of transistor 13 is coupled to point 31 and the drains of transistors 11 and 12. Transistors 11 and 12 are connected in parallel and their sources are connected by way of line 37 to ground. The gate of transistor 12 is coupled to receive the output from the source of transistor 14 and the drain of transistor 17. Transistors 12 and 14 from the feedback subcircuit of the invention. Transistor 17 whose gate is coupled to received reference signal $V_p$ is utilized to initialize point 32, i.e., discharge capacitor 34 to ground.

The gate of transistor 14 is connected to the output line. Connected in parallel are two transistors 15 and 16, the source electrodes of which are also coupled to the output line. The drains of transistors 15 and 16 are tied together to received the reference $v_x$. The gates of transistors 15 and 16 are coupled to receive reference $v_y$ and the potential at point 31, respectively. Transistor 15 is utilized to set the lowest or third voltage level to be generated on the output line. Transistor 16 is utilized in combination with the feedback subcircuit comprising transistors 12 and 14 to set the intermediate voltage level. The first or 0-voltage level is also set by the transistor 16 in combination with the 0 state of the voltage reference $v_x$. Additional embodiments shown within the circuits (in dotted lines) 35, 39, and 40 will be discussed hereinafter.

Figure 2:
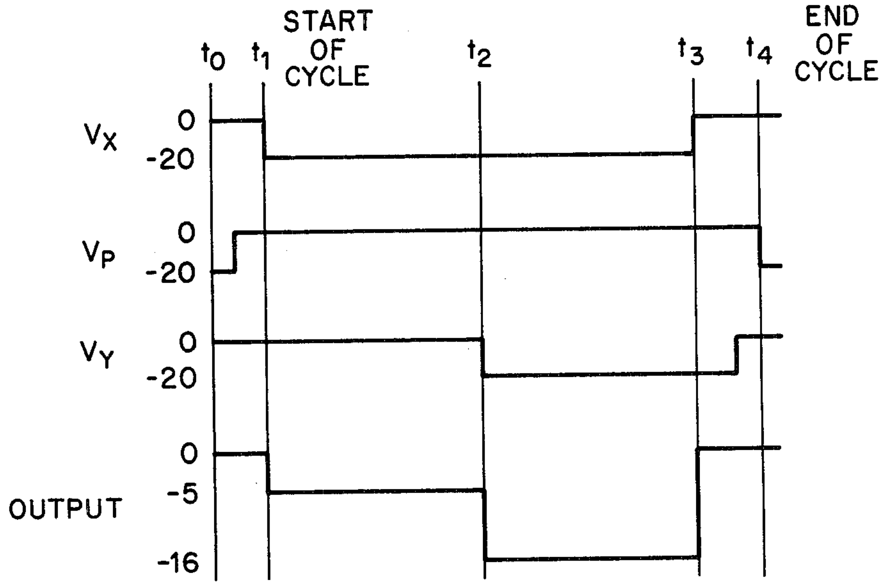
FIG. 2 is a timing diagram illustrating the operation of the tri-level voltage generator circuit of FIG. 1.

Having described the circuit connections of the preferred embodiment of the invention reference is now made to FIG. 1 in combination with the timing diagram of FIG. 2. Initial conditions are established at time $t_0$ wherein the reference signals $v_x$ and $v_y$ are 0 volts and wherein the reference signal $v_p$ is −20 volts. The output, as will be explained, is at the first level of 0 volts. Transistors 11 and 12 having established a potential with a series transistor 13 by means of voltage reference 10, point 31 will have a potential impressed thereon of approximately −10 volts due to the ratio factor in transistors 11 and 13. Transistor 13 is conducting because its gate is at a more negative potential than the source which is connected to point 31. Transistor 11 also conducts because its gate is at a more negative potential than its source which is a ground or 0 volts. Transistor 12 is off, that is not conducting, because reference $v_p$ is at −20 volts therefore allowing transistor 17 to conduct and discharging capacitance 34 so that point 32, the gate of transistor 12 is essentially at 0 volts. With 0 volts on the gate of transistor 12, transistor 12 therefore will not conduct. It should again be noted that any time a gate electrode is at the 0-volt potential, the transistor will be nonconductive because the substrate of the transistor is also connected to 0 volts or ground.

Transistor 15, at time $t_0$ is off because reference $v_y$ is at 0 volts. Assuming that the output voltage is essentially 0 volts, transistor 16 will also be off since reference $v_x$ is 0 volts, that is both the source and drain of transistor 16 are at the same potential. However, the gate of transistor 16 is at approximately −10 volts and therefore transistor 16 will be capable of conducting should the voltage at either the source or drain of transistor 16 differ. The output voltage is at 0 volts, thus transistor 14 will also be off since its gate is at 0 volts. Should the output voltage for some reason not be at 0 volts at time $t_0$ and is different from the reference signal $v_x$, such as −8 volts, transistor 16 will conduct so that the voltage of reference $v_x$, now 0 volts, will be impressed on the output. When this does occur, both the drain and source of transistor 16 will be at 0 potential and therefore transistor 16 will be turned off but will remain capable of conducting.

At a time between $t_0$ and $t_1$ reference $v_p$ changes from −20 volts to 0 volts while the other two reference signals remain at 0 volts. This causes transistor 17 to turn off, however, the voltage at point 32 remains at 0 volts therefore keeping the transistor 12 off. At time $t_1$ the output reduces to approximately −5 volts. This will be explained as follows. Reference $v_x$ changes state from 0 volts to −20 volts while references $v_p$ and $v_y$ remains at 0 volts. With reference $v_x$ at −20 volts and the output at 0 volts, transistor 16 is turned on. The voltage at the output then starts to go down. This also causes the voltage at the gate of transistor 14 to go down, which therefore turns on transistor 14. Point 32 therefore decreases in voltage below the threshold level so that transistor 12 is also turned on. The combination of transistors 12 and 14 coming on lowers the potential at point 31 to a value below the threshold voltage which therefore turns off transistor 16. It should be remembered that the turn on of transistor 16 was the initial cause of the fall of the voltage on the output line in the first place. By turning transistor 16 off, this prevents any further change in the output voltage. This change has taken the output voltage down to approximately −5 volts which is the intermediate or second level of the output. The capacitor 38 coupled between the output and ground keeps this level at −5 volts.

This level of −5 volts is established because the transistor 14 could not conduct until the voltage difference between its gate and source was above the threshold voltage of approximately −2 volts. Furthermore, the transistor 12 could not conduct until it reached a threshold level of approximately −2 volts, i.e., a level of −2 volts between the gate and source of transistor 12. This establishes a 4-volt drop between the output line and ground. Furthermore, the capacitances to the substrate particularly capacitor 34 and a capacitor (not shown) from point 31 to ground delay the turn off of transistor 16 and therefore establish a voltage level of approximately −5 volts below the 0 -volt level or more particularly, the 4-volt threshold level plus the overdrive necessary to turn off the transistor 16. The overdrive determines the time-voltage relationship in the circuit such that some voltages in the loop continue to go up and others to go down until they are sufficient to turn off transistor 16. Therefore, time effects the meeting point at which the voltage at point 31 is sufficient to turn off transistor 16. The time voltage relationship is also effected by the capacitor 38.

As mentioned hereinbefore, the intermediate voltage might have been adjusted in a number of ways. First, the voltage drop could have been increased by adding one or more transistors in series with the transistors 12 and 14 thereby adding approximately a −2-volt drop for a 1-transistor addition bringing the second level to −7 volts. Also, one of the two feedback subcircuit transistors could have been removed causing the second level to rise to −3 volts. The impedance ratio of the series transistors also could have been changed by making one of a large area and the other of smaller area between the drain and source. This would then change the potential at point 31. Further, the number of transistors in voltage reference 10 could have been increased or decreased thereby affecting the conductivity of transistor 11 and therefore the potential at point 31. Of course additional capacitors from points 31 and 32 to ground will also affect the intermediate value.

The voltage level at the output remains at −5 volts until time $t_2$, at which time the voltage output drops to approximately −16 volts. At time $t_2$ references $v_x$ and $v_p$ will remain in their states of −20 volts and 0 volts respectively. Voltage reference $V_y$ will change from 0 volts to −20 volts. With −20 volts at the gate of transistor 15, it will be turned on and the output voltage will fall toward the voltage level of the $v_x$ reference signal which is at −20 volts. The lower voltage on the output line will be determined by the resistance drop between the drain and the source of conducting transistor 15. The transistor 15 is in effect in a source follower relationship with the output and therefore the output comes close to the value of reference $v_x$ or approximately −16 volts. It should be noted that at time $t_2$ the feedback subcircuit comprised of transistors 12 and 14 remains enabled and accordingly, transistor 14 and transistor 12 remain on, keeping transistor 16 off. Upon a drop to −16 volts at the output, this conditions is amplified and transistor 16 is further turned off.

The output remains at −16 volts until time $t_3$ at which time the reference $v_x$ changes from −20 volts to 0 volts, while the other references $v_p$ and $v_y$ remain at levels of 0 and −30 volts, respectively. This puts a 0-volt potential on the drain of transistor 15. With the reference $v_y$ at the gate of transistor 15 still at −20 volts and the voltage at the source of transistor 15 at −16 volts, this condition turns on transistor 15 in the reverse direction very hard and brings the output to the level of reference $v_x$ or approximately 0 volts. At a time shortly thereafter between $t_3$ and $t_4$ reference $v_y$ returns to 0 volts thereby turning transistor 15 off, the output remaining at 0 volts. At time $t_4$, which is the end of the cycle, reference $V_p$ returns to −20 volts while references $V_x$ and $V_y$ remain at 0 volts. With reference $V_p$ at −20 volts, this turns transistor 17 back on, thereby discharging the capacitor 34 such that point 32 is at 0 volts and so that point 31 returns to the initial potential of approximately −10 volts. This causes transistor 16 to be capable of conduction again. The cycle now having been completed additional tri-level voltages may be generated at the output as determined by the receipt of reference signals $v_x$, $v_y$ and $v_p$.

When a tri-level voltage is not being generated, it is desirable to minimize current flow in the circuit. This is accomplished by the addition of circuit 35 which replaces the connection 37 between the source electrodes of transistors 11, and 12 and ground. Circuit 35 comprises a transistor 36 whose source is connected to ground and whose drain is connected to the source of transistors 11 and 12. The gate of transistor 36 is coupled to receive the reference signal $v_x$. During this nongeneration period, reference $v_x$ is 0 volts, therefore turning transistor 36 off and disabling any current flow from ground potential through transistors 11, 12, and 13 to supply voltage $-v_s$. Between times $t_1$ and $t_3$ or that time in which the tri-level output voltage is being generated, reference $v_x$ will be a −20 volts and will therefore allow current to flow through such transistors.

A further improvement in the above-described circuit results in an improved or reduced time between cycles. In order to establish a known starting potential at point 31 regardless of the time between cycles, circuit 40 is utilized and comprises a transistor 41 which is connected in parallel with transistor 13. The gate of transistor 41 is coupled to receive reference $v_p$. Thus, circuit 40 establishes a particular rise time at point 31. Utilization of circuit 40 is especially important when circuit 35 is used. In operation, during the nongeneration period, reference $v_p$ is −20 volts, turning on transistor 41, which thereby enables point 31 to change to the −10-volt potential very rapidly after transistor 36 is also turned on. During this time, transistor 41, in effect, reduces the impedance between supply voltage $-v_S$ and point 31 so that the rise time is reduced.

In certain system configurations reference $v_y$ may change state from −20 volts to 0 volts between times $t_2$ and $t_3$ instead of between times $t_3$ and $t_4$. The circuit operation as has been explained hereinbefore was dependent on reference $v_y$ changing such state between times $t_3$ and $4_4$ so that the output voltage could change from −16 volts to 0 volts at time $t_3$. Such a system configuration, for example, which may require different timing arrangements is shown in the copending application referenced hereinbefore When a memory is being read and when a memory is being written into different timing is utilized for reference $v_y$. The purpose of such differences in timing between read and write operations is to transfer control between the read line and data line to the column amplifier and digit line. In order to compensate for this earlier change in state of reference $v_y$ inverting circuit 39 may be added. Inverting circuit 39 includes three transistors 21, 22 and 23. The drain of transistor 22 is connected to the output line while the source thereof is connected to ground. The gate of transistor 22 is coupled to the source of transistor 23 and the drain of transistor 21. Transistors 21 and 23 are connected in series arrangement and the drain of transistor 23 is connected to supply voltage $-V_s$ as is its gate. The source of transistor 21 is connected to ground while its gate is connected to receive reference $v_x$.

In operation therefore, and referring to the timing arrangement as shown in FIG. 2, except that reference $v_y$ will change state from −20 volts to 0 volts between times $t_2$ and $t_3$ and will remain at 0 volts until time $t_4$, if inverting circuit 39 were not added then the operation of transistor 15 as explained hereinbefore would not return the output voltage to 0 volts at time $t_3$ because it, reference $v_y$, had changed state to 0 volts at an earlier time. Between the time of change in the state of reference $v_y$ from −20 volts to volts 0 volts the output will remain at approximately −16 volts because of the charge on capacitor 38. Thus, by adding the inverting circuit 39, the output will return to 0 volts at time $t_3$ when reference $v_x$ returns to 0 volts. When reference $v_x$ does return to 0 volts, this turns off transistor 21 and causes the potential at the gate of transistor 22 to exceed the threshold level thereby turning transistor 22 on. Previously when reference $v_x$ was at −20 volts, transistor 21 had been on as was transistor 23, accordingly the gate potential of transistor 22 was above its threshold potential. Because transistor 23 remains on when transistor 21 turns off approximately, −15 volts is impressed on the gate of transistor 22 as stated hereinbefore turns transistor 22 on. With transistor 22 on, the ground level or 0 volts is applied to the output line thereby changing its state to 0 volts.

It should be understood that the tri-level voltage generator circuit of the present invention may be modified in a variety of ways. The preceding description has been of a preferred embodiment of the present invention. Various changes and modifications will be apparent to those skilled in the art and therefore this invention is to be interpreted not by the specific disclosure herein but only in view of the appended claims.

Having now described the invention what is claimed as new and for which it is desired to secure Letters Patent is:

1. A tri-level voltage generator circuit comprising:

A. first circuit means having an output line,

B. second circuit means, wherein said first and second circuit means include elements having substantially equivalent characteristics, C. said output line being connected to an input of said second circuit means as a reference thereto, D. voltage-changing means in said first circuit means for generating first, intermediate and third voltage levels on said output line in response to timing signals applied to other inputs of said first circuit means, E. first control means in said first circuit means for responding to changes in characteristics of elements in said first circuit means, and F. second control means responsive to said first control means for controlling the level of the intermediate voltage in response to a change in characteristics of elements in said second circuit means.

2. A circuit as defined in Claim 1 wherein said elements include transistors and wherein said characteristics include the threshold voltage of said transistors.

3. A circuit as defined in claim 2 wherein said second circuit means is a transistor memory circuit.

4. A circuit as defined in claim 3 wherein said first circuit means and said memory circuit are combined on a single integrated circuit chip.

5. A circuit as defined in claim 2 wherein said means for generating comprises:

A. feedback means having an input an output, said input connected to said output line;

B. first control means having an output coupled to said output line and having an input adapted to respond to both the output of said feedback means and a reference signal; and wherein C. said intermediate level signal is generated when said reference signal is received and when said output of said feedback means changes from a first state to a second state.

6. A circuit as defined in claim 5 wherein said first circuit means and said second circuit means are combined on a single integrated circuit chip, whereby changes of threshold voltage of said transistors in said second circuit means are substantially the same as changes in threshold voltage of said transistors in said first circuit means.

7. A circuit as defined in claim 6 wherein said feedback means includes a first transistor and wherein said intermediate voltage changes as the threshold characteristics of said first transistor changes.

8. A circuit as defined in claim 7 wherein said transistors in said first circuit means and said second circuit means are of the field effect type.

9. A tri-level voltage generator circuit having an output line, said circuit comprising:

A. means for providing a first reference signal having first and second states;

B. means for providing a feedback controllable voltage;

C. feedback means having an input and an output, said input coupled to said output line and said output coupled to said feedback controllable voltage;

D. first control means coupled to said output line and responsive to both said feedback controllable voltage and said first state of said first reference signal, for generating a first level voltage on said output line; and wherein E. a change of said first reference signal to said second state causes said first control means to change said first voltage level on said output line toward said second level thereby causing said feedback means to substantially change said feedback controllable voltage causing said first control means to complete said change of output line voltage at said second voltage level.

10. A circuit as defined in claim 9 further including:

A. means for providing a second reference signal having first and second states; and B. second control means coupled to said output line and responsive to both said second state of said first reference signal and said second state of said second reference signal for generating a third voltage level on said output line.

11. A circuit as defined in claim 10 wherein said second control means regenerates said first voltage level when said second reference signal is in said second state and said first reference signal changes to said first state.

12 A circuit as defined in claim 11 wherein:

A. said feedback means includes a first transistor having first, second and third electrodes, said first electrode thereof connected to said feedback controllable voltage, said second electrode thereof connected to said output line and said third electrode thereof coupled to a first potential;

B. said first control means includes a second transistor having first, second and third electrodes, said first electrode thereof connected to receive said first reference signal, said second electrode thereof connected to said feedback controllable voltage and said third electrode thereof connected to said output line; and wherein c. a change in the threshold voltage between said second and third electrodes of said first transistor changes the voltage level of said second voltage level.

13. A circuit as defined in claim 12 wherein

A. said first voltage level is generated on said output line when said second transistor is nonconductive, said first transistor is conductive and said first reference signal is in said first state; and B. said second voltage level is generated on said output line when in sequence said first reference signal changes to said second state, causing said second transistor to become temporarily conductive, causing said generator circuit output voltage to approach said second voltage level, causing said first transistor to become conductive, and causing said feedback controllable voltage to change in magnitude to stop conduction of said second transistor thereby stopping said generator circuit output voltage at said second voltage level, the polarity of said second voltage level being that of said second state of said first reference signal.

14. A circuit as defined claim 13 wherein:

A. said second control means includes a third transistor having first, second, and third electrodes, said first electrode thereof connected to receive said first reference signal, said second electrode thereof connected to receive said second reference signal and said third electrode thereof connected to said output line; and wherein B. said third voltage level is generated when said first reference signal is in said second state and when said second reference signal changes to said second state thereby causing said third transistor to conduct and changing said second voltage level to said third voltage level, the polarity of said third voltage level being that of said second state of said first reference signal; and wherein said first voltage level is regenerated when said second reference signal is in said second state and when said first reference signal changes to said first state causing said third transistor to conduct in a reverse direction so that said generator circuit output voltage changes from said third voltage level to said first voltage level, the polarity of said first voltage being that of said first state of said first reference signal.

15. A circuit as defined in claim 14 wherein said means for providing a feedback controllable voltage includes:

A. a second potential;

B a plurality of series connected transistors connected at one end to said second potential; and C. a pair of series connected transistors connected at one and to said second potential, connected at the other end to said first potential, and connected for response to the other end of said plurality of series connected transistors, the junction of said pair of series connected transistors coupled to provide said feedback controllable voltage.

16. A circuit as defined in claim 14 further including means for disabling said means for providing a feedback controllable voltage when a tri-level voltage is not being generated at said output line.

17. A circuit as defined in claim 14 further including means for changing the output voltage of said generator circuit from said third level to said first level when said second reference signal is in said first state and when said first reference signal changes to said first state.

18. A circuit as defined in claim 14 further including means for establishing initial conditions in said feedback means when a tri-level voltage is not being generated at said output line.

19. A tri-level voltage generator circuit having an output line, said circuit comprising:

A. means for providing a feedback controllable voltage, said voltage having a first and second state;

B. means for providing first and second reference signals, said signals having a first and second state;

C. a feedback subcircuit having an input and an output, said input coupled to said output line and said output coupled to control said feedback voltage;

D a first control subcircuit responsive to said feedback voltage and responsive to said first reference signal and having an output coupled to said output line;

E. a second control subcircuit responsive to said first reference signal and responsive to said second reference signal and having an output coupled to said output line; and wherein F. A tri-level output voltage is generated on said output line in the sequence wherein 1. a first voltage level is generated by means of said first control subcircuit when said feed back voltage is in said second state and said first reference signal is in said first state.
2. said tri-level output voltage approaches a second voltage level by means of said first control subcircuit when said feedback voltage is in said second state and said first reference signal is in said second state,
3. said second level is generated by means of said feedback circuit which responds to the change from said first voltage level toward said second voltage level causing said feedback voltage to change to said first state thereby causing said first control subcircuit to settle thereby causing said first control subcircuit to settle said tri-level output at said second voltage level,
4. a third voltage level is generated by means of said second control subcircuit when said first reference signal is in said second state and said second reference signal is in said second state, and
5. said first voltage level is regenerated by means of said second control subcircuit when said second reference signal is in said second state and when said first reference signal changes back to said first state.